United States Patent
DeVries et al.

(10) Patent No.: US 9,333,698 B2
(45) Date of Patent: May 10, 2016

(54) FAUCET BASE RING

(71) Applicant: MASCO CORPORATION OF INDIANA, Indianapolis, IN (US)

(72) Inventors: Adam M. DeVries, Anderson, IN (US); Kurt Judson Thomas, Indianapolis, IN (US); Kyle Robert Davidson, Noblesville, IN (US); Michael J. Veros, Carmel, IN (US); Robert W. Rodenbeck, Indianspolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 356 days.

(21) Appl. No.: 13/836,075

(22) Filed: Mar. 15, 2013

(65) Prior Publication Data
US 2014/0261767 A1    Sep. 18, 2014

(51) Int. Cl.
E03C 1/05    (2006.01)
B29C 51/12    (2006.01)
E03C 1/04    (2006.01)

(52) U.S. Cl.
CPC ............... *B29C 51/12* (2013.01); *E03C 1/0401* (2013.01); *E03C 1/055* (2013.01); *Y10T 137/6966* (2015.04)

(58) Field of Classification Search
CPC .......... E03C 1/0401; E03C 1/055; E03C 1/04
See application file for complete search history.

(56) References Cited

U.S. PATENT DOCUMENTS

| | | |
|---|---|---|
| 3,904,169 A | 9/1975 | Cohn et al. |
| 3,998,240 A | 12/1976 | Liautaud |
| 4,037,624 A | 7/1977 | Turner et al. |
| 4,186,761 A | 2/1980 | Guarnieri |
| 4,353,056 A | 10/1982 | Tsikos |
| 4,623,451 A | 11/1986 | Oliver |
| 4,667,987 A | 5/1987 | Knebel |
| 4,749,126 A | 6/1988 | Kessener |
| 4,762,611 A | 8/1988 | Schipper |
| 4,849,098 A | 7/1989 | Wilcock et al. |
| 4,901,922 A | 2/1990 | Kessener |
| 4,915,347 A | 4/1990 | Iqbal et al. |
| 4,955,535 A | 9/1990 | Tsutsui et al. |
| 4,998,673 A | 3/1991 | Pilolla |
| 5,126,041 A | 6/1992 | Weber |

(Continued)

FOREIGN PATENT DOCUMENTS

| | | |
|---|---|---|
| CN | 201250949 Y | 6/2009 |
| CN | 201496622 | 6/2010 |

(Continued)

OTHER PUBLICATIONS

International Searching Authority, International Search Report and Written Opinion for PCT/US2014/017107, 13 pages, dated Jun. 10, 2014.

(Continued)

*Primary Examiner* — Kevin Murphy
(74) *Attorney, Agent, or Firm* — Faegre Baker Daniels LLP

(57) ABSTRACT

An insulator base for an electronic faucet includes a housing supporting a light assembly and a connecting wire electrically coupled to the light assembly. A polymer housing secures the light assembly and the connecting wire within the housing. A non-conductive exterior film allows the isolation base to match the finish on an electronically controlled faucet for electrical isolation and faucet status display.

20 Claims, 5 Drawing Sheets

(56) References Cited

U.S. PATENT DOCUMENTS

| | | | |
|---|---|---|---|
| 5,171,429 A | 12/1992 | Yasuo | |
| 5,184,642 A | 2/1993 | Powell | |
| 5,220,488 A | 6/1993 | Denes | |
| 5,224,509 A | 7/1993 | Tanaka et al. | |
| 5,232,008 A | 8/1993 | Jeffries et al. | |
| 5,276,600 A | 1/1994 | Takase et al. | |
| 5,388,287 A | 2/1995 | Tischler et al. | |
| 5,458,154 A | 10/1995 | Niemann et al. | |
| 5,566,702 A | 10/1996 | Philipp | |
| 5,669,417 A | 9/1997 | Lian-Jie | |
| 5,758,688 A | 6/1998 | Hamanaka et al. | |
| 5,873,387 A | 2/1999 | Weber et al. | |
| 5,918,855 A | 7/1999 | Hamanaka et al. | |
| 5,942,733 A | 8/1999 | Allen et al. | |
| 6,014,985 A | 1/2000 | Warshawsky | |
| 6,018,828 A | 2/2000 | Loschelder | |
| 6,021,960 A | 2/2000 | Kehat | |
| 6,082,407 A | 7/2000 | Paterson et al. | |
| 6,126,290 A | 10/2000 | Veigel | |
| 6,192,530 B1 | 2/2001 | Dai | |
| 6,202,980 B1 | 3/2001 | Vincent et al. | |
| 6,209,153 B1 | 4/2001 | Segien, Jr. | |
| 6,294,786 B1 | 9/2001 | Marcichow et al. | |
| 6,370,712 B1 | 4/2002 | Burns et al. | |
| 6,370,965 B1 | 4/2002 | Knapp | |
| 6,382,030 B1 | 5/2002 | Kihara et al. | |
| 6,385,794 B1 | 5/2002 | Miedzius et al. | |
| 6,385,798 B1 | 5/2002 | Burns et al. | |
| 6,434,765 B1 | 8/2002 | Burns et al. | |
| 6,452,514 B1 | 9/2002 | Philipp | |
| 6,513,787 B1 | 2/2003 | Jeromson et al. | |
| 6,523,193 B2 | 2/2003 | Saraya | |
| 6,548,192 B2 | 4/2003 | Chen | |
| 6,548,193 B2 | 4/2003 | Chen | |
| 6,551,722 B2 | 4/2003 | Jonte et al. | |
| 6,558,816 B2 | 5/2003 | Chen | |
| 6,619,320 B2 | 9/2003 | Parsons | |
| 6,659,124 B2 | 12/2003 | Burns et al. | |
| 6,716,345 B2 | 4/2004 | Snyder | |
| 6,729,349 B2 | 5/2004 | Brandebusemeyer | |
| 6,734,685 B2 | 5/2004 | Rudrich | |
| 6,757,921 B2 | 7/2004 | Esche | |
| 6,764,775 B2 | 7/2004 | Chen | |
| 6,770,376 B2 | 8/2004 | Chen | |
| 6,770,384 B2 | 8/2004 | Chen | |
| 6,792,629 B2 | 9/2004 | Nelson et al. | |
| 6,803,133 B2 | 10/2004 | Chen | |
| 6,805,458 B2 | 10/2004 | Schindler et al. | |
| 6,874,527 B2 | 4/2005 | Meeder | |
| 6,909,101 B2 | 6/2005 | Nishioka | |
| 6,962,168 B2 | 11/2005 | McDaniel et al. | |
| 6,964,404 B2 | 11/2005 | Patterson et al. | |
| 7,008,073 B2 | 3/2006 | Stuhlmacher, II | |
| 7,017,600 B2 | 3/2006 | Klein | |
| 7,104,519 B2 | 9/2006 | O'Maley et al. | |
| 7,150,293 B2 | 12/2006 | Jonte | |
| 7,174,577 B2 | 2/2007 | Jost et al. | |
| 7,175,158 B2 | 2/2007 | Thomas | |
| 7,201,175 B2 | 4/2007 | DeBoer et al. | |
| 7,228,874 B2 | 6/2007 | Bolderheij et al. | |
| 7,258,781 B2 | 8/2007 | Warren et al. | |
| 7,344,902 B2 | 3/2008 | Basin et al. | |
| 7,377,661 B2 | 5/2008 | Douglass | |
| 7,406,980 B2 | 8/2008 | Pinette | |
| 7,415,991 B2 | 8/2008 | Meehan et al. | |
| 7,434,960 B2 | 10/2008 | Stuhlmacher, II | |
| 7,464,418 B2 | 12/2008 | Seggio et al. | |
| 7,467,874 B2 | 12/2008 | Gautschi et al. | |
| 7,518,381 B2 | 4/2009 | Lamborghini et al. | |
| 7,537,023 B2 | 5/2009 | Marty et al. | |
| 7,624,757 B2 | 12/2009 | Schmitt et al. | |
| 7,627,909 B2 | 12/2009 | Esche | |
| 7,628,512 B2 | 12/2009 | Netzel, Sr. et al. | |
| 7,631,372 B2 | 12/2009 | Marty et al. | |
| 7,633,055 B2 | 12/2009 | Nall et al. | |
| 7,666,497 B2 | 2/2010 | Takatsuki et al. | |
| 7,690,395 B2 | 4/2010 | Jonte et al. | |
| 7,717,133 B2 | 5/2010 | Pinette et al. | |
| 7,721,761 B2 | 5/2010 | Thomas | |
| 7,748,409 B2 | 7/2010 | Pinette et al. | |
| 7,766,043 B2 | 8/2010 | Thomas et al. | |
| 7,793,677 B2 | 9/2010 | Pinette | |
| 7,806,141 B2 | 10/2010 | Marty et al. | |
| 7,819,137 B2 | 10/2010 | Nelson et al. | |
| 7,819,541 B2 | 10/2010 | Kunkel | |
| 7,850,323 B2 | 12/2010 | Keiper et al. | |
| 7,883,261 B2 | 2/2011 | Yu | |
| 7,896,025 B2 | 3/2011 | Hanson | |
| 8,127,782 B2 | 3/2012 | Jonte et al. | |
| 8,162,236 B2 | 4/2012 | Rodenbeck et al. | |
| 8,198,979 B2 | 6/2012 | Haag et al. | |
| 8,277,070 B1 | 10/2012 | Schwarz | |
| 8,438,672 B2 | 5/2013 | Reeder et al. | |
| 8,453,669 B2 | 6/2013 | Veros et al. | |
| 2002/0150798 A1 | 10/2002 | Jonte et al. | |
| 2003/0213062 A1 | 11/2003 | Honda et al. | |
| 2004/0179351 A1 | 9/2004 | Patterson | |
| 2005/0257628 A1 | 11/2005 | Nikaido et al. | |
| 2005/0279676 A1 | 12/2005 | Izzy et al. | |
| 2006/0124183 A1 | 6/2006 | Kuo | |
| 2006/0157127 A1 | 7/2006 | Bars et al. | |
| 2006/0157128 A1 | 7/2006 | Frackowiak et al. | |
| 2006/0283511 A1 | 12/2006 | Nelson | |
| 2006/0289343 A1 | 12/2006 | Schmitt et al. | |
| 2007/0031624 A1 | 2/2007 | Brosius | |
| 2007/0069418 A1 | 3/2007 | Liao et al. | |
| 2007/0121326 A1 | 5/2007 | Nall et al. | |
| 2007/0137714 A1 | 6/2007 | Meehan et al. | |
| 2007/0241977 A1 | 10/2007 | Vance | |
| 2007/0273394 A1 | 11/2007 | Tanner et al. | |
| 2008/0099091 A1 | 5/2008 | Benstead | |
| 2008/0109956 A1 | 5/2008 | Bayley et al. | |
| 2008/0178935 A1 | 7/2008 | Thomas | |
| 2008/0178942 A1 | 7/2008 | Pinette et al. | |
| 2008/0178954 A1 | 7/2008 | Pinette et al. | |
| 2008/0185060 A1 | 8/2008 | Nelson | |
| 2008/0257706 A1 | 10/2008 | Haag | |
| 2008/0291660 A1 | 11/2008 | Gautschi et al. | |
| 2008/0308165 A1 | 12/2008 | Meehan et al. | |
| 2009/0000026 A1 | 1/2009 | Hanson | |
| 2009/0039176 A1 | 2/2009 | Davidson et al. | |
| 2009/0094740 A1 | 4/2009 | Ji | |
| 2009/0154524 A1 | 6/2009 | Girelli | |
| 2009/0276954 A1 | 11/2009 | Davidson et al. | |
| 2010/0117660 A1 | 5/2010 | Douglas et al. | |
| 2010/0180375 A1 | 7/2010 | Meehan et al. | |
| 2010/0242274 A1 | 9/2010 | Rosenfeld et al. | |
| 2011/0003144 A1 | 1/2011 | Nakamura et al. | |
| 2011/0012378 A1 | 1/2011 | Ueno et al. | |
| 2011/0016625 A1 | 1/2011 | Marty et al. | |
| 2011/0186163 A1* | 8/2011 | Farag | 137/801 |
| 2011/0187957 A1 | 8/2011 | Kim et al. | |
| 2011/0209781 A1 | 9/2011 | Fath | |
| 2012/0055886 A1 | 3/2012 | Hunter et al. | |
| 2012/0188179 A1 | 7/2012 | Karlsson | |
| 2012/0200517 A1 | 8/2012 | Nikolovski | |
| 2012/0223805 A1 | 9/2012 | Haag et al. | |
| 2012/0267493 A1 | 10/2012 | Meehan et al. | |
| 2013/0029164 A1 | 1/2013 | Fujiwara | |
| 2013/0098489 A1 | 4/2013 | Meehan et al. | |
| 2013/0186482 A1 | 7/2013 | Veros et al. | |

FOREIGN PATENT DOCUMENTS

| | | |
|---|---|---|
| CN | 201875209 | 6/2011 |
| JP | 2001120448 | 5/2001 |
| JP | 2002242246 | 8/2002 |
| JP | 2003232059 | 8/2003 |
| JP | 2004116083 A | 4/2004 |
| WO | WO2006/098795 | 9/2006 |
| WO | WO 2007/059051 | 5/2007 |
| WO | WO2007/123639 | 11/2007 |

(56) References Cited

FOREIGN PATENT DOCUMENTS

| WO | WO 2008/088534 | 7/2008 |
|----|----------------|--------|
| WO | WO 2009/158498 | 12/2009 |
| WO | WO 2010/120070 | 10/2010 |

OTHER PUBLICATIONS

Photograph of "Current Parts," 1 page, available at least as early as Oct. 2010.
Chicago Faucets brochure, "Electronic Faucets," dated Jun. 2008, 16 pgs.
MOEN PureTouch Illustrated Parts, Available at Least as Early as 2003, 1 page.
Dave Van Ess, Capacitive Sensing Builds a Better Water-Cooler Control, Cypress Semiconductor Corp. Nov. 2007, 9 pages.
Aviation Faucet System, Product Brochure, Franke Aquarotter GmbH, downloaded Oct. 1, 2012, 6 pages.
Springking Industry Col, Limited, Touch Sensor Faucet, Product Specification, downloaded Oct. 1, 2012.
MOEN PureTouch Owner's Manual INS412A, Available at Least as Early as 2003, 18 pages.
MOEN, Single Handle Filtering Faucet, INS1169-4/06, 6 pages, dated Apr. 2006.
Wavelock Advanced Technology Co., Ltd, Introducing Wavelock Advanced Technorogy's Decorative Metallic Tape and Sheet, 18 pages, available at least as early as Nov. 2012.
Sloan Valve Company, Optima Plus EBF-750 product description, dated Feb. 2011, 2 pages.
Sloan Valve Company, Installation Instructions and User Manual for SLOAN EAF Gooseneck Series Faucets, Code No. 0816409, dated Jul. 2011, 10 pages.
Grohe, Europlus E "Touch-Free" Centerset Product Catalog, downloaded from http://www.grohecatalog.com/print/36212 Nov. 6, 2013, 3 pages.

* cited by examiner

FAUCET BASE RING

BACKGROUND AND SUMMARY OF THE INVENTION

The present disclosure relates generally to an apparatus and method for an automatic or electronic faucet. More particularly, the present disclosure relates to an apparatus and method for a finish for an electronically isolating base for an automatic or electronic faucet.

Automatic and electronic faucets (hereinafter referred to as electronic faucets), such as those including capacitive control or sensing features, are becoming increasingly popular, particularly in residential households. Exemplary electronic faucets and isolating bases are disclosed in U.S. patent application Ser. No. 13/752,722, filed Feb. 4, 2013 and entitled "Capacitive User Interface," and U.S. patent application Ser. No. 13/277,000, filed Oct. 19, 2011, and entitled "Insulator Base for Electronic Faucet," the disclosures of which are hereby incorporated by reference.

Electronic faucets tend to be at least partially formed of metal or other electrically conductive material. Electronic faucets containing capacitive sensing functionality may be mounted to a mounting deck, such as a kitchen sink, that may be made of metal, such as stainless steel. In such instances, an electrically non-conductive mounting assembly may be used to insulate the metal capacitive sensing components of the faucet from the metal sink. One such non-conductive mounting assembly may include an insulator base positioned intermediate a faucet delivery spout and a mounting deck. A light emitter may be supported within the insulator base for providing a visual indication of faucet operation or status to the user.

The electronic faucet may include an outer wall formed of an electrically conductive material, such as brass or zinc with a chrome plated finish. In typical electronic faucets, the non-conductive mounting assembly includes an outer surface molded from a polymer, such as an acetal copolymer or polyoxymethylene (POM).

One such illustrative mounting assembly may include an instulator base positioned intermediate a faucet delivery spout and a mounting deck. A light emitter may be supported with the insulator base for providing a visual indication of an operation, mode, or status of the faucet to a user.

In some cases, it is desirable to provide an insulator base that appears to have the same finish as the electronic faucet, but still provides electric insulation between the faucet and the mounting deck. Additionally, it is desirable to protect the light emitter and associated circuitry from exposure to water, which may adversely affect the performance of the electronic faucet.

According to an illustrative embodiment of the present disclosure, an insulator base for an electronic faucet having a decorative finish mounted to a mounting deck includes a light assembly coupled to a connecting wire. A housing is affixed to the support board. The housing includes an outer sidewall and an upper surface extending about an opening defining a longitudinal axis. The housing permits the transmission of light from the light emitter through the housing. A non-conductive film covers the outer sidewall and at least a portion of the upper surface of the housing. The film has a decorative finish matching the decorative finish of the electronic faucet. The insulator base is configured to electrically insulate the electronic faucet from the mounting deck.

According to another illustrative embodiment of the present disclosure, an electronic faucet includes a delivery spout. A water conduit extends within the delivery spout and includes a water outlet. An insulator base is positioned intermediate the delivery spout and a mounting deck. The base electrically insulates the delivery spout from the mounting deck. The base includes a housing defining an opening receiving the water conduit and includes an outer sidewall and an upper surface. A film covers the outer sidewall and at least a portion of the upper surface. A light assembly that is supported by the housing and includes a light emitter encapsulated by the housing. A controller is operably coupled to the light assembly, the controller configured to control operation of the light emitter.

According to another illustrative embodiment of the present disclosure, a method of manufacturing an insulator base for an electronic faucet includes vacuum forming a non-conductive laminate material into a first geometry. A light assembly including a light emitter is positioned in the first geometry. A housing is molded around the light assembly and first geometry, wherein the housing encapsulates the light assembly and permits the transmission of light from the light emitter through the housing.

According to another illustrative embodiment, an insulator base for an electronic faucet having a decorative finish mounted to a mounting deck is provided. The insulator base includes a housing including an outer sidewall and an upper surface extending about an opening defining a longitudinal axis, and a non-conductive film covering at least a portion of the housing, wherein the film has a decorative finish matching the decorative finish of the electronic faucet; wherein the insulator base is configured to electrically insulate the electronic faucet from the mounting deck.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
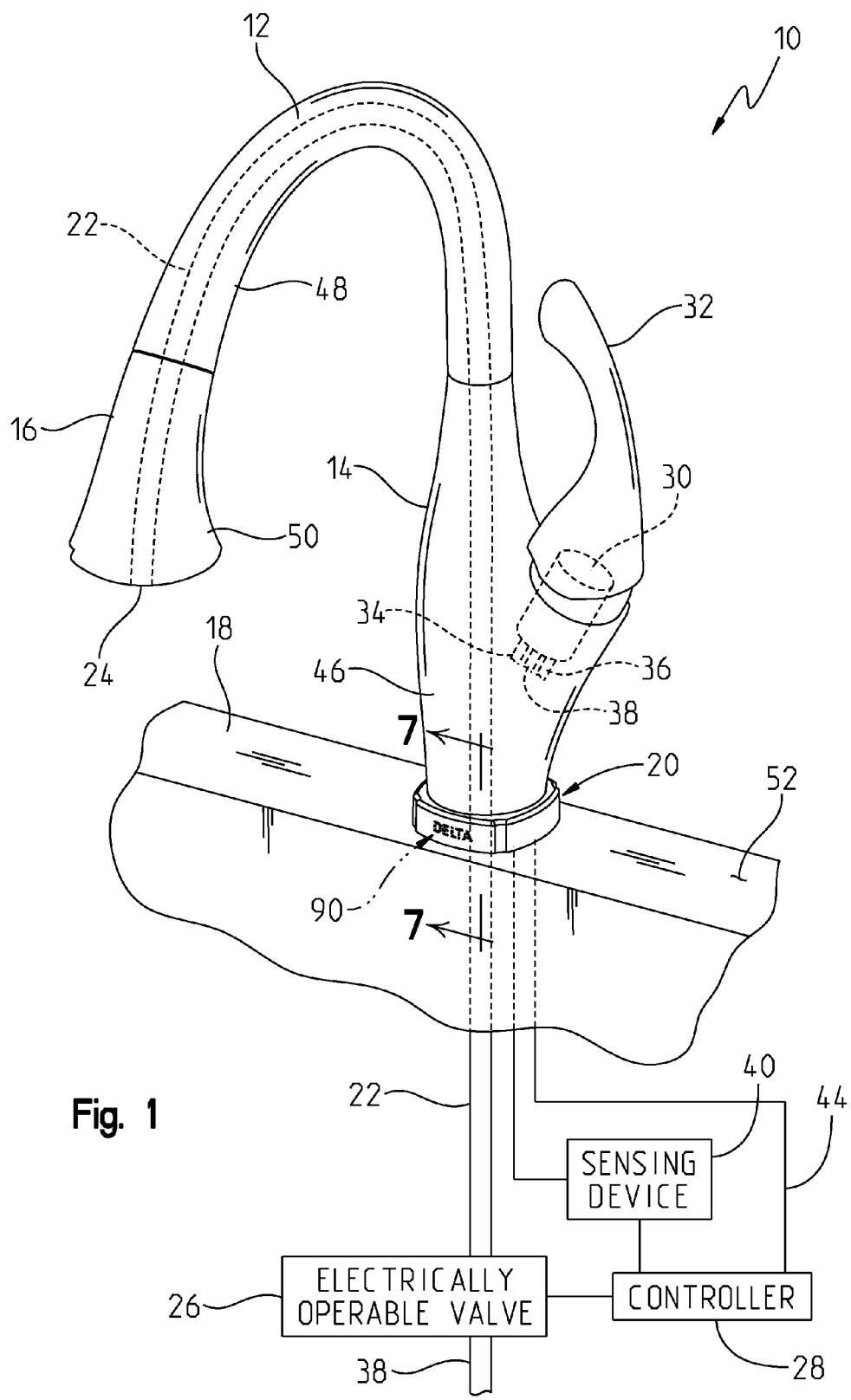
FIG. 1 is a perspective view of an illustrative electronic faucet including an insulator base of the present disclosure positioned intermediate a delivery spout and a mounting deck.

The embodiments of the invention described herein are not intended to be exhaustive or to limit the invention to precise forms disclosed. Rather, the embodiments selected for description have been chosen to enable one skilled in the art to practice the invention.

Corresponding reference characters indicate corresponding parts throughout the several views. Although illustratively used to electrically isolate a faucet base and mounting deck, a base ring according to the present disclosure may also be used to electrically isolate other fluid delivery devices, including pulldown wands, faucet spray heads, hoses, fluid conduits, pullout wands, fluid tubes, side sprayers, and faucet spouts.

Referring initially to FIG. 1, an illustrative electronic faucet 10 is shown as including a delivery spout 12 supported by a hub 14. A removable spray head 16 may be releasably coupled to the delivery spout 12 in a conventional manner. The electronic faucet 10 is coupled to a mounting deck, such as a sink deck 18, through a known fastener or anchor (not shown). The hub 14 is illustratively positioned above the sink deck 18 by an insulator base 20 of the present disclosure.

In the illustrative embodiment, a flexible fluid tube or conduit 22 extends from below the sink deck 18 through the insulator base 20, upwardly through the hub 14 and delivery spout 12 to a fluid outlet 24 supported by the spray head 16. An electrically operable valve 26 illustratively controls water flow through the conduit 22 to the fluid outlet 24. The electrically operable valve 26 is in communication with a controller 28 which is configured to open and close the electrically operable valve 26 to control water flow through the conduit 22 and fluid outlet 24. A power source, such as a battery (not shown), may provide electrical power to the controller 28 and the electrically operable valve 26.

In certain illustrative embodiments, a manual valve 30 may be positioned upstream from, and fluidly coupled in series with, the electrically operable valve 26. The manual valve 30 is illustratively operably coupled to a handle 32 supported on a side of the hub 14. Hot and cold water inlet tubes 34 and 36 fluidly couple hot and cold water sources (not shown) to the manual valve 30. Mixed water output from the manual valve 30 is illustratively supplied to a flexible outlet tube 38, which is fluidly coupled to the electrically operable valve 26. As may be appreciated, the manual valve 30 operates in a conventional manner wherein movement of the handle 32 may control temperature and/or flow rate of water delivered to the flexible outlet tube 38.

The electrically operable valve 26 of the electronic faucet 10 may operate through the use of various sensing means, including infrared or capacitive sensing. In one illustrative embodiment, the electronic faucet 10 may operate through the use of capacitive sensing, for example, in the manner described in any one of the following U.S. patents, all of which are hereby incorporated by reference in their entireties: U.S. Pat. No. 6,962,168 to McDaniel et al., entitled "CAPACITIVE TOUCH ON/OFF CONTROL FOR AN AUTOMATIC RESIDENTIAL FAUCET", issued Nov. 8, 2005; U.S. Pat. No. 7,150,293 to Jonte, entitled "MULTI-MODE HANDS FREE AUTOMATIC FAUCET", issued Dec. 16, 2006; and U.S. Pat. No. 7,690,395 to Jonte et al., entitled "MULTI-MODE HANDS FREE AUTOMATIC FAUCET", issued Apr. 6, 2010.

In an illustrative embodiment, the controller 28 may be in communication with a sensing device 40 of the electronic faucet 10. As detailed above, the sensing device 40 includes a capacitive sensor. More particularly, the sensing device 40 may be capacitively coupled to selected electrically conductive faucet components, such as the hub 14, the delivery spout 12, the spray head 16, and/or the handle 32. The hub 14 illustratively includes an outer wall or shell 46 formed of an electrically conductive material, such as brass or zinc with a chrome plated or other decorative finish. The delivery spout 12 and the spray head 16 may each similarly include an outer wall or shell 48 and 50 formed of electrically conductive material, such as brass or zinc with a chrome plated or other decorative finish.

Figure 6:
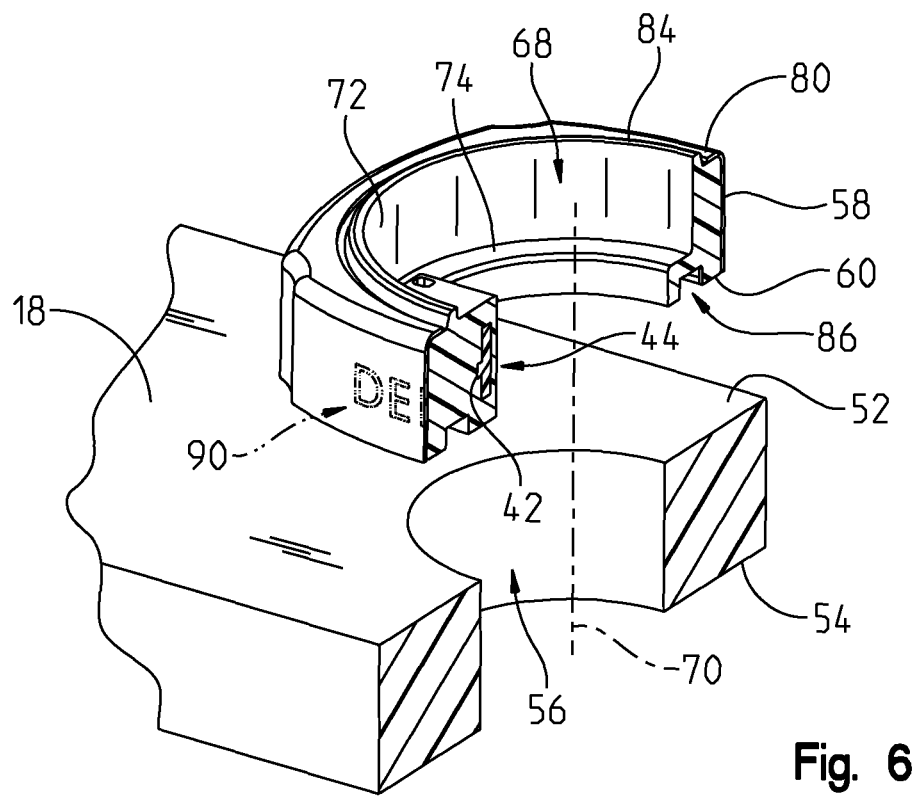
FIG. 6 is a perspective cross-sectional view showing the insulator base above a mounting deck.

With reference to FIGS. 1 and 6, the sink deck 18 illustratively includes a top surface 52, an underside or a bottom surface 54, and a sink deck aperture 56 extending between the top surface 52 and the bottom surface 54 of the sink deck 18. The sink deck 18 may comprise any conventional mounting deck, for example, relatively thick (approximately 0.5 inches thick) cast iron/enamel sink deck, or a relatively thin (approximately 0.031 inches thick) stainless steel sink deck. The insulator base 20 is supported on the top surface 52 of the sink deck 18 and electrically insulates the hub 14, the delivery spout 12, the spray head 16, and the handle 32 from the sink deck 18 to facilitate proper operation of the capacitive sensing device 40.

Figure 2:
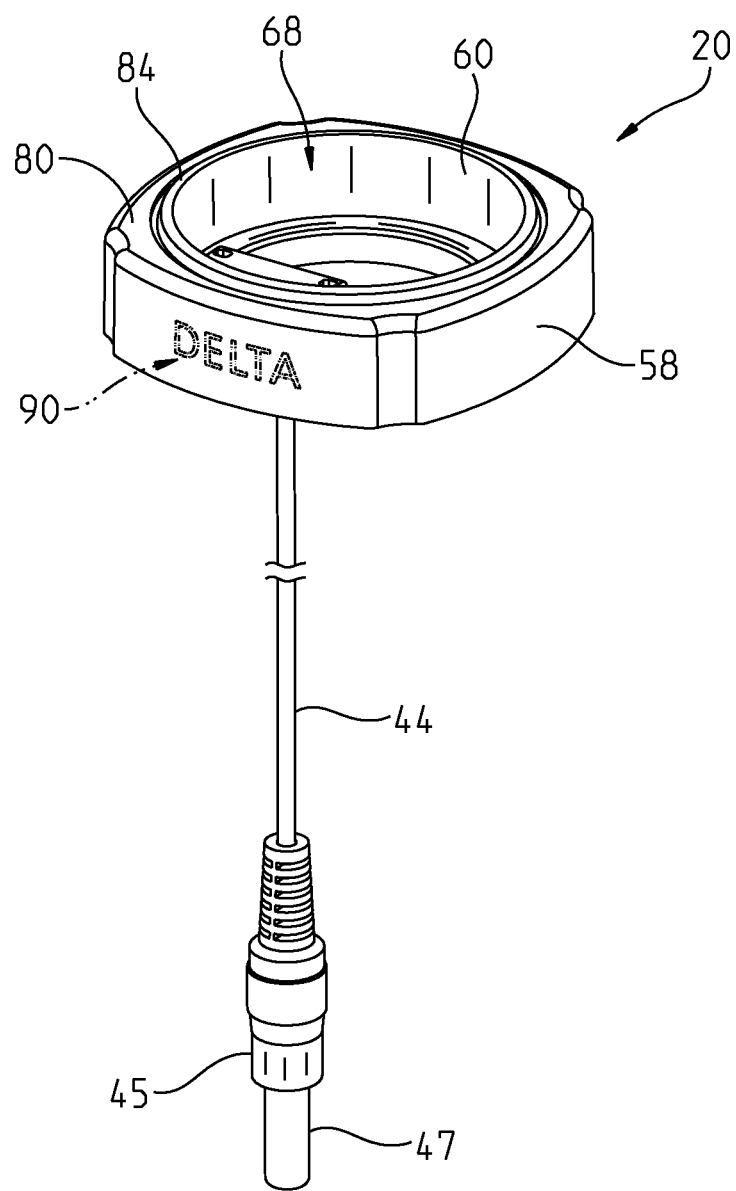
FIG. 2 is a perspective view of the insulator base of FIG. 1.
Figure 3:
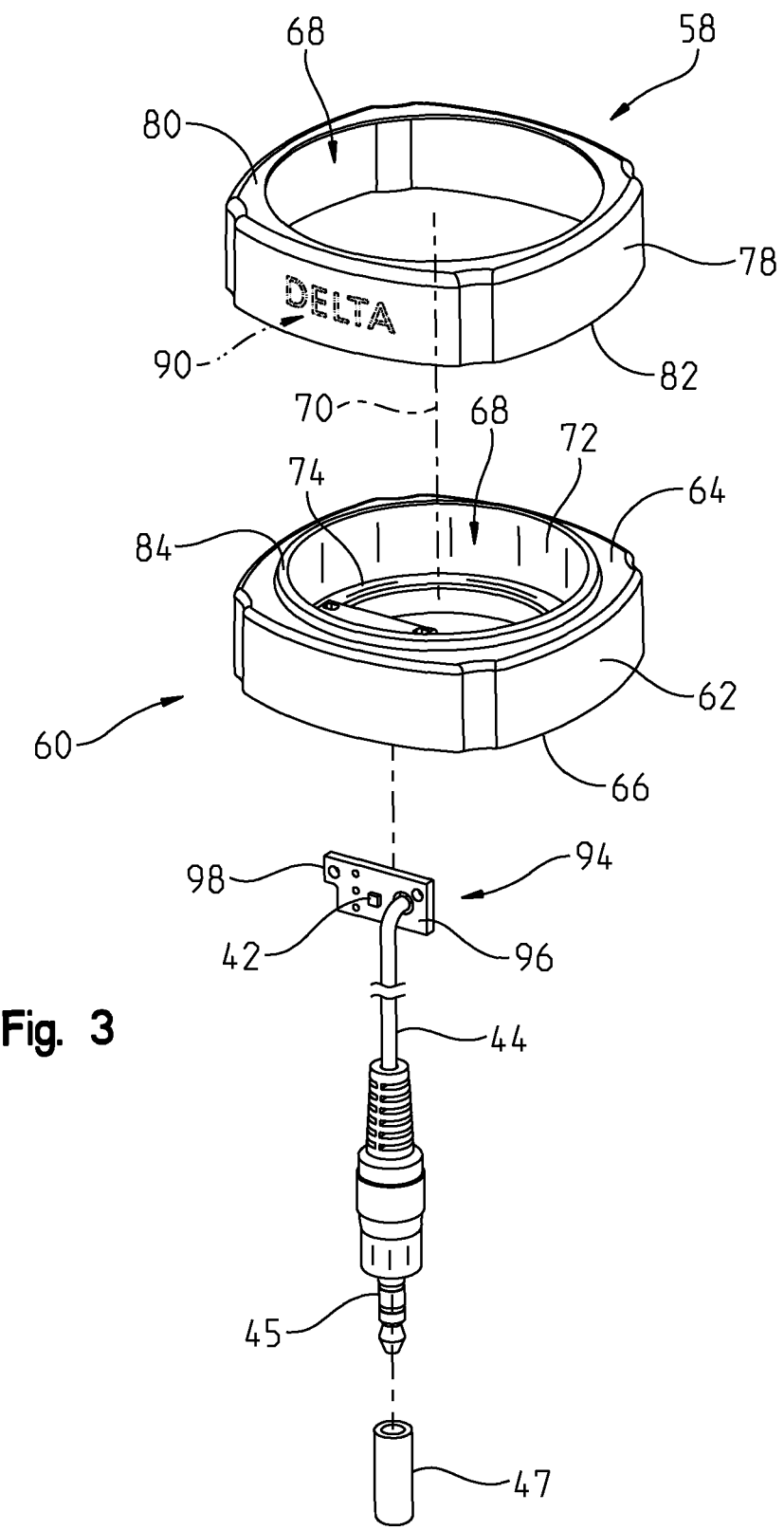
FIG. 3 is an exploded perspective view of the insulator base of FIG. 1.
Figure 4:
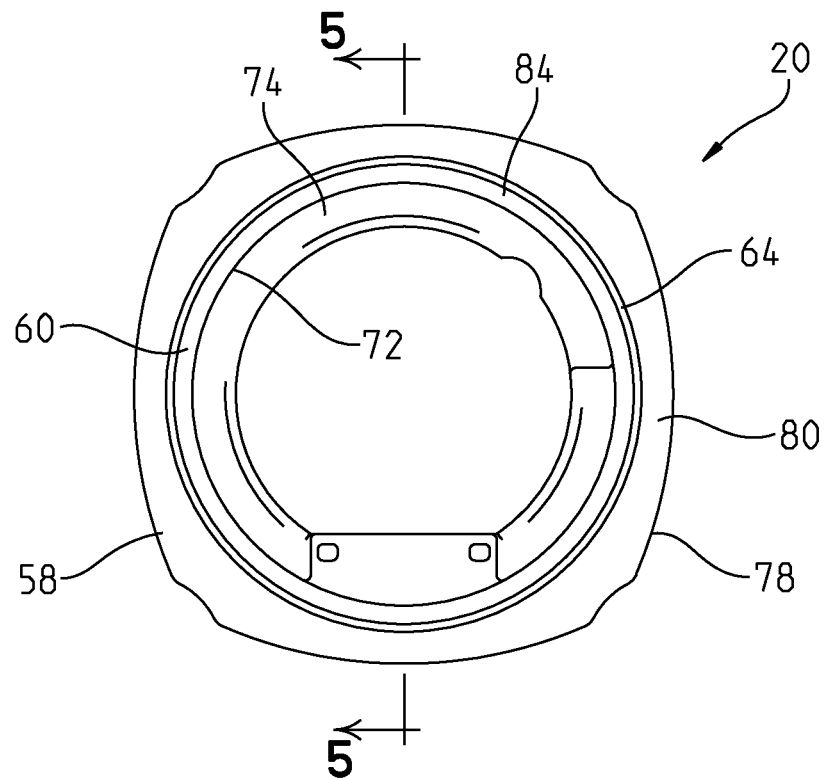
FIG. 4 is a top plan view of the insulator base of FIG. 1.

Referring to FIGS. 1-3, indicators, such as light emitter 42 of insulator base 20 are in electrical communication with the controller 28, illustratively through an electrical connecting wire 44. Additional indicators, such as an audible speaker (not shown), may also be in electrical communication with controller 28.

As illustrated in FIG. 3, first end of connecting wire 44 may include a conventional electrical coupler 45 for coupling with the controller 28, while a second end of connecting wire 44 may be coupled to light emitter 42. As illustrated in FIG. 2, the first end of connecting wire 44 may further include a cover 47 protecting conventional electrical coupler 45. Cover 47 is removed prior to operatively coupling electrical coupler 45 to controller 28.

Referring next to FIGS. 2-6, the insulator base 20 illustratively includes film 58 and a housing 60. Insulator base 20 extends around a center opening 68 defining a longitudinal axis 70 of the insulator base 20.

Film 58 illustratively has an outer sidewall 78 extending between an upper surface 80 and a lower surface 82 and around center opening 68. The film 58 is illustratively formed from a non-conductive material having a decorative finish matching the finish of the delivery spout 12, the hub 14, and/or the spray head 16. Film 58 illustratively has a thickness of about 0.040 inches.

In an illustrative embodiment, the film 58 is formed from a non-conductive oxide or film. In an illustrative embodiment, the film 58 is formed from a laminate of polymeric materials. An exemplary laminate film is available as Super Techmirror® from Wavelock Advanced Technology Co., which in one embodiment comprises layers of acrylonitrile butadiene styrene polymer (ABS), a polyethylene terephthalate (PET)—based metal layer, and poly(methyl methacrylate)(PMMA). The appearance of the film 58 can be adjusted by adjusting the composition and/or thickness of the PET-based metal layer. The layers are laminated together with adhesive layers in a screen-printing process.

Housing 60 illustratively has an outer sidewall 62 extending around a center opening 68 and extending between an upper surface 64 and a lower surface 66. An inner sidewall 72 may be formed concentrically within the outer sidewall 62. Housing 60 further includes a lower ledge or shoulder 74 extending around at least a portion of inner sidewall 72. A raised upper housing ring 84 surrounding center opening 68 is illustratively formed on upper surface 64. A lower recess 86 is illustratively formed in lower surface 66. Lower recess 86 is configured to receive a sealing member (not shown) for sealing with the top surface 52 of the sink deck 18.

Figure 7:
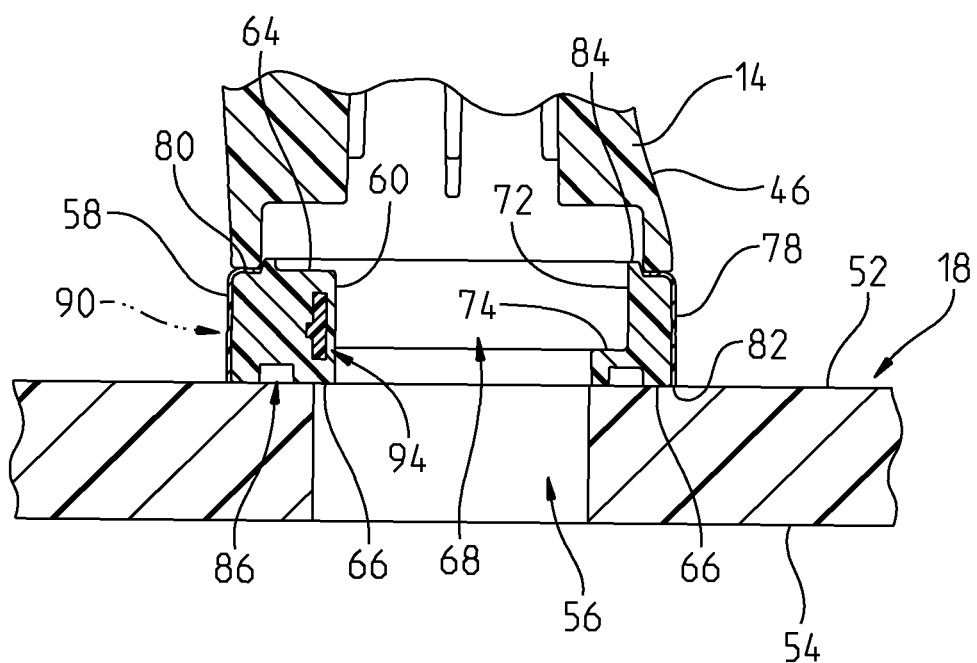
FIG. 7 is a side cross-sectional view of the faucet and insulator base of FIG. 1.

As illustrated in FIG. 7, the hub 14 is configured to be positioned around raised upper housing ring 84 and to be in contact with the upper surface 82 of film 58, electrically isolating hub 14 from sink deck 18. In other embodiments (not shown), the hub 14 is configured to be in contact with one or more of upper surface 64, inner sidewall 72, and shoulder 74 of housing 60. The insulator base 20 may be secured to the hub 14 and/or sink deck 18 through known methods, including screws, pins, retaining clips, and adhesives (not shown).

Conduit 22 extends through center opening 68 of insulator base 20, and into hub 14 and delivery spout 12 (FIG. 1).

Figure 5:
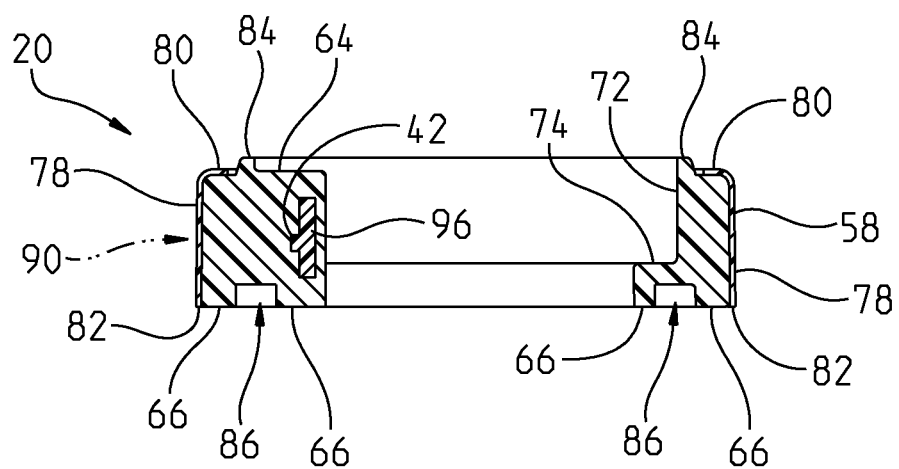
FIG. 5 is a side cross-sectional view of the insulator base of FIG. 1 taken along line 5-5 of FIG. 4.

With reference to FIGS. 3 and 5, a light assembly 94 is illustratively received within the chamber 76. The light assembly 94 illustratively includes a support board 96. The support board 96 illustratively includes an orientation tab 98. A light emitter 42, illustratively a light emitting diode (LED), is supported by the support board 96 and is electrically coupled to the connecting wire 44 to provide electrical communication between the controller 28 and the light emitter 42.

Illustratively, housing 60 is insert molded to create an overmold around light assembly 94, coupling light assembly 94 to housing 60. In another embodiment, (not shown) the light assembly 94 is coupled to housing 60 by a pair of resilient latching members extending downwardly from an upper portion of the housing 60 to secure the support board 96.

Overmolding housing 60 around light assembly 94 encapsulates the light assembly 94 within the chamber 76. Illustratively, encapsulating the light assembly 94 with housing 60 prevents water from contacting light assembly 94.

As illustrated, housing 60 permits transmission of light from light source 42 through housing 60. Illustratively, housing 60 is formed of a material that diffuses light from light source 42 as it passes through housing 60. In an illustrative embodiment, housing 60 is formed from a clear material, translucent, transparent material. Exemplary materials include translucent and transparent low density polyethylene (LDPE).

In the illustrated embodiment, housing 60 is illuminated by light from light source 42 passing through housing 60. In one embodiment, at least a portion of housing 60 is not covered by hub 14, sink deck 18, or film 58, and light source 42 provides a visual indication of operation, mode, or status to a user of electronic faucet 10. In an exemplary embodiment, at least a portion of raised upper housing ring 84 is not covered by hub 14, sink deck 18, or film 58, and light source 42 provides a visual indication of operation, mode, or status to a user of electronic faucet 10.

As illustrated in FIGS. 1-3, film 58 includes status indicator 90, shown in phantom. Status indicator 90 allows light from light emitter 42 to pass through film 58 to provide a visual indication of operation, mode, or status to a user of electronic faucet 10. Status indicator 90 may be applied to the material from which film 58 is made prior to the application of the film 58 to housing 60, or applied to film 58 after it has been affixed to housing 60. In an illustrative embodiment, status indicator 90 is formed from a void in screen printing film 58. In one embodiment, when light from light emitter 42 is not passing through housing 60, status indicator 90 is not illuminated, and may not be visible or be difficult to detect to a user of the electronic faucet 10. When light from emitter 42 is passing through housing 60, status indicator 90 is illuminated to provide a visual indication of operation, mode, or status to a user of electronic faucet 10. Illustratively, housing 40 diffuses the light passing therethrough, which evenly illuminates the housing 60 and status indicator 90.

In another embodiment (not shown), housing 60 is formed from a non-conductive polymer, such as an acetal copolymer or polyoxymethylene (POM). In this illustrative embodiment, housing 60 may or may not be opaque. A transparent lens formed from a clear material, translucent, transparent material, such as translucent and transparent low density polyethylene (LDPE) is received within housing 60 and aligned with status indicator 90. The lens permits the transmission of light from the light emitter through the lens to illuminate status indicator 90 when light emitter 42 is illuminated. In an illustrative embodiment, the light assembly 94 is inserted into the housing 60, and the lens is insert molded around light assembly 94. The film 58 may be applied to the housing 60 prior to or after the lens is insert molded.

A method of manufacturing the insulator base 20 for electronic faucet 10 illustratively includes the steps of vacuum forming film 58 in an injection molding tool. A laminate material is vacuum molded into the geometry of film 58. Light assembly 94 is then placed into the tool, and molten material for forming the housing 60 is injected into the tool using conventional injection molding processes. The molten material adheres to the film 58 and encapsulates light assembly 94, forming the insulator base 20.

Another method of manufacturing insulator base 20 for electronic faucet 10 illustratively includes the steps of forming a laminate material around a mold to produce the geometry of film 58, and die cutting geometry from any excess material. The film 58 is then placed into an injection molding tool with light assembly 94. Molten material for forming the housing 60 is injected into the tool using conventional injection molding processes. The molten material adheres to the film 58 and encapsulates light assembly 94, forming the insulator base 20.

Yet another method of manufacturing the insulator base 20 for electronic faucet 10 illustratively includes the steps of inserting light assembly 94 into an injection molding tool, followed by injecting molten material for forming the housing 60 into the tool. The molten material encapsulates light assembly 94. Film 58 is then formed by molding a laminate material over the housing 60, forming the insulator base 20.

The embodiments of the invention described herein are not intended to be exhaustive or to limit the invention to precise forms disclosed. Rather, the embodiments selected for description have been chosen to enable one skilled in the art to practice the invention.

Although the invention has been described in detail with reference to certain preferred embodiments, variations and modifications exist within the spirit and scope of the invention as described and defined in the following claims.

The invention claimed is:

1. An insulator base for an electronic faucet having a decorative finish mounted to a mounting deck, the insulator base comprising:
    a housing including an outer sidewall and an upper surface extending about an opening defining a longitudinal axis,
    a non-conductive film covering at least a portion of the housing, wherein the film has a decorative finish matching the decorative finish of the electronic faucet; and
    a light assembly affixed to the housing, the light assembly including a light emitter electrically coupled to a connecting wire;
    wherein the insulator base is configured to electrically insulate the electronic faucet from the mounting deck, and wherein the housing permits the transmission of light from the light emitter through the housing.

2. The insulator base of claim 1, wherein the film covers the outer sidewall and at least a portion of the upper surface of the housing.

3. The insulator base of claim 1, wherein the film is formed from a laminate material.

4. The insulator base of claim 1, further comprising a lens affixed to the housing, the lens permitting the transmission of light from the light emitter through the lens.

5. The insulator base of claim 1, wherein the film includes at least one indicator configured to be illuminated by light from the light emitter.

6. The insulator base of claim 5, wherein the at least one indicator is not visible or difficult to detect when not illuminated by light from the light emitter.

7. The insulator base of claim 1, wherein the housing diffuses light transmitted from the light emitter through the housing.

8. The insulator base of claim 1, wherein the housing is formed from a translucent or transparent material.

9. The insulator base of claim 1, wherein the housing is formed from low density polyethylene.

10. The insulator base of claim 1, wherein the light assembly further includes a support board coupled to the light emitter, the housing being affixed to the light assembly by insert molding the housing around the support board.

11. The insulator base of claim 1, wherein the housing encapsulates the light assembly to prevent contact from water.

12. The insulator base of claim 1, wherein the housing includes an upper end configured to be positioned below a delivery spout, a lower end configured to be positioned above a mounting deck, and the opening configured to receive a water conduit extending into the delivery spout.

13. The insulator base of claim 1, wherein the film comprises layers of acrylonitrile butadiene styrene polymer, a polyethylene terephthalate-based metal layer, and poly(methy methacrylate).

14. An electronic faucet comprising:
a delivery spout including an exterior surface having a metallic finish;
a water conduit extending within the delivery spout and including a water outlet;
an insulator base positioned intermediate the delivery spout and a mounting deck, the base electrically insulating the delivery spout from the mounting deck, the base including a housing defining an opening receiving the water conduit and having an outer sidewall, an upper surface, and a lower surface in contact with the mounting deck, and a film extending from the upper surface to the lower surface and covering at least a portion of the housing, the film having an appearance matching the metallic finish of the exterior surface of the delivery spout;
a light assembly supported by the housing and having a light emitter encapsulated by the housing; and
a controller operably coupled to the light assembly, the controller configured to control operation of the light emitter;
wherein the film includes at least one status indicator configured to be visible when light from the light emitter is transmitted through the housing.

15. The electronic faucet of claim 14, wherein the film covers the outer sidewall and at least a portion of the upper surface of the housing.

16. The electronic faucet of claim 14, wherein the film comprises a laminate of polymeric materials.

17. The electronic faucet of claim 14, further comprising a connecting wire electrically coupling the controller and the light assembly, the connecting wire passing through the opening and below the mounting deck.

18. The electronic faucet of claim 14, wherein the at least one status indicator is not visible or difficult to detect when light from the light emitter is not transmitted through the housing.

19. The electronic faucet of claim 14, wherein the housing is formed from a translucent or transparent low density polytheylene.

20. The electronic faucet of claim 14, wherein the light assembly further includes a support board coupled to the light emitter, the housing being affixed to the light assembly by insert molding the housing around the support board.

* * * * *